US010710544B2

(12) United States Patent
Suemune et al.

(10) Patent No.: US 10,710,544 B2
(45) Date of Patent: Jul. 14, 2020

(54) EXTERNAL AIRBAG

(71) Applicant: c/o SUBARU CORPORATION, Tokyo (JP)

(72) Inventors: Hiroshi Suemune, Tokyo (JP); Yoshiyuki Hashimoto, Tokyo (JP); Akihiro Onodera, Tokyo (JP); Hiroshi Yoneyama, Tokyo (JP); Daisuke Ototsuji, Tokyo (JP); Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 186 days.

(21) Appl. No.: 15/837,618

(22) Filed: Dec. 11, 2017

(65) Prior Publication Data

US 2018/0099639 A1 Apr. 12, 2018

Related U.S. Application Data

(63) Continuation-in-part of application No. 15/054,034, filed on Feb. 25, 2016, now abandoned.

(30) Foreign Application Priority Data

Mar. 9, 2015 (JP) .................................. 2015-046276

(51) Int. Cl.
*B60R 21/36* (2011.01)
*B60R 21/00* (2006.01)

(52) U.S. Cl.
CPC ...... *B60R 21/36* (2013.01); *B60R 2021/0004* (2013.01)

(58) Field of Classification Search
CPC ......... B60R 21/36; B60R 21/38; B60R 21/34; B60R 2021/0004; B60R 2021/346
USPC .................................................. 180/274, 271
See application file for complete search history.

(56) References Cited

U.S. PATENT DOCUMENTS

| | | | |
|---|---|---|---|
| 2003/0178239 A1* | 9/2003 | Takimoto | ............ B60R 21/2338 180/274 |
| 2014/0027195 A1 | 1/2014 | Kalliske et al. | |
| 2014/0034406 A1 | 2/2014 | Kalliske, et al. | |

FOREIGN PATENT DOCUMENTS

| | | | |
|---|---|---|---|
| CN | 101367367 A | 2/2009 | |
| CN | 202641585 U | 1/2013 | |
| CN | 103347745 A | 10/2013 | |
| DE | 198 03 165 A1 | 7/1999 | |
| DE | 19948181 A1 * | 4/2001 | ................ B60J 1/00 |
| DE | 100 14 832 A1 | 10/2001 | |

(Continued)

OTHER PUBLICATIONS

U.S. Office Action dated Aug. 11, 2017 in U.S. Appl. No. 15/054,034.

(Continued)

*Primary Examiner* — Keith J Frisby
(74) *Attorney, Agent, or Firm* — McGinn I.P. Law Group, PLLC.

(57) ABSTRACT

An external airbag includes: a lower edge bag that is deployed to extend along a lower edge of a windshield of an automobile, on a front side of the windshield; lateral edge bags in a pair that are deployed to extend along both lateral edges of the windshield, on the front side of the windshield; and an upper edge bag that is deployed to extend along an upper edge of the windshield, on the front side of the windshield.

7 Claims, 15 Drawing Sheets

(56) References Cited

FOREIGN PATENT DOCUMENTS

| | | | |
|---|---|---|---|
| DE | 10014832 A1 * | 10/2001 | ............. B60R 21/36 |
| DE | 10059 224 A1 | 7/2002 | |
| DE | 10059224 A1 * | 7/2002 | ............. B60R 21/36 |
| DE | 10102597 B4 * | 6/2011 | |
| EP | 1 700 758 A1 | 9/2003 | |
| EP | 1 350 692 A1 | 10/2003 | |
| EP | 2 070 778 A1 | 6/2009 | |
| JP | 2000-264146 A | 9/2000 | |
| JP | 2000264146 A * | 9/2000 | ............. B60R 21/36 |
| JP | 2004-330825 A | 11/2004 | |
| JP | 2006-088923 A | 4/2006 | |
| KR | 20130007349 A * | 1/2013 | |
| WO | WO-0198119 A1 * | 12/2001 | ............. B60R 21/36 |

OTHER PUBLICATIONS

U.S. Office Action dated May 10, 2017 in U.S. Appl. No. 15/054,034.
Chinese Office Action dated Apr. 6, 2017 in Chinese Patent Application No. 201610130092.4 with an English translation thereof.
Japanese Office Action dated May 24, 2016 with an English translation thereof.
JPO Decision to Grant dated Nov. 22, 2016 in Japanese Application No. 2015-046276 with an English translation thereof.
JPO Notification of Refusal dated May 24, 2016 in Japanese Application No. 2015-046276 with an English translation thereof.

* cited by examiner

EXTERNAL AIRBAG

CROSS-REFERENCE TO RELATED APPLICATIONS

The present application is a Continuation-in-Part Application of U.S. application Ser. No. 15/054,034 filed Feb. 25, 2016 which claims priority from Japanese Patent Application No. 2015-046276 filed on Mar. 9, 2015, the entire contents of which are hereby incorporated by reference.

BACKGROUND

1. Technical Field

The present disclosure relates to an external airbag and particularly to an external airbag that protects a subject to be protected against collision with a pair of front pillars.

2. Related Art

In related art, external airbags have been used that protect a subject to be protected such as a pedestrian against the impact of a collision in case the subject to be protected collides with an automobile. In general, an external airbag is folded and housed in an automobile and is deployed by injection of deployment gas into the airbag. The deployed external airbag, when receiving a subject to be protected, is deformed depending on the pressure from the subject, and thus the collision energy of the subject is absorbable by the external airbag. External airbags are in practical use which are each deployed along, for instance, front pillars which are formed solidly in an automobile. Because a subject to be protected may collide with the front pillars in various directions and speeds, an external airbag adapted to the collision is called for.

Thus, as a technique for protecting a subject to be protected involved in a collision with a high speed, for instance, Japanese Unexamined Patent Application Publication (JP-A) No. 2011-213142 proposes an airbag device in which a door portion formed in a cover member has a front door portion and an inner door portion, the front door portion being disposed forwardly of a mirror body to be opened so that the inner edge side faces the outside, the inner door portion being disposed inwardly of the mirror body to be opened so that the front edge side faces the rear side. In the airbag device, at the time of deployment of the airbag, the bag body is made to project quickly through an opening for projection, which is formed by opening the front door portion and the inner door portion, and thus the subject to be protected may be protected by deploying the airbag before the subject collides with a front pillar.

SUMMARY OF THE INVENTION

However, the airbag device of JP-A No. 2011-213142 has a problem in that only collision with a front pillar is protected and the range of protection is small. For instance, a subject to be protected may collide with the cowl panel and the front edge (a portion corresponding to the front brace) of the roof panel which are formed solidly along the windshield similarly to the front pillars. Also, the subject to be protected, after colliding with a front pillar, may be thrown laterally to have a secondary collision with an oncoming vehicle. In particular, when a collision with a bicycle occurs, the subject to be protected riding the bicycle has a high centroid position, and thus the subject is thrown into a wide range rearwardly and the risk of a secondary collision increases. In this manner, in an actual collision accident, a subject to be protected is thrown into a wide range including the front pillar, and thus there have been calls for comprehensive protection of the subject to be protected against various types of collision.

It is desirable to provide an external airbag capable of protecting a subject to be protected in a wide range.

An aspect of the present disclosure provides an external airbag that includes: a lower edge bag that is deployed to extend along a lower edge of a windshield of an automobile on a front side of the windshield; lateral edge bags in a pair that are deployed to extend along both lateral edges of the windshield on the front side of the windshield; and an upper edge bag that is deployed to extend along an upper edge of the windshield on the front side of the windshield.

The lower edge bag may be deployed to cover a cowl panel which is provided along the lower edge of the windshield. The edge bags in the pair may be deployed to cover front pillars in a pair that are provided along the both lateral edges of the windshield. The upper edge bag may be deployed to cover a front edge of a roof panel, the front edge being provided along the upper edge of the windshield.

Both ends of the lower edge bag may be coupled to lower ends of the lateral edge bags in the pair, and the upper edge bag may be coupled to upper ends of the lateral edge bags in the pair. The lower edge bag, the lateral edge bags in the pair, and the upper edge bag may be housed in a vicinity of the lower edge of the windshield. After the lower edge bag and the lateral edge bags in the pair are deployed, the upper edge bag may be deployed.

The lateral edge bags in the pair and the upper edge bag may be formed such that an end thereof forwardly projecting from the windshield is bent inwardly. The external airbag may have a thickness forwardly projecting from the windshield the thickness gradually increasing from a lower edge side to an upper edge side of the windshield.

BRIEF DESCRIPTION OF THE DRAWINGS

FIG. 1A is a front view and FIG. 1B is a side view of the external airbag;

FIG. 6A is a perspective view and FIG. 6B is a sectional view of the external airbag, taken along line VIB-VIB of FIG. 6A;

FIGS. 9 and 10 are a top view and a cross sectional view of a first step of deployment of the lower edge airbag 109, upper edge airbag 108, and the lateral edge airbag 111 of the airbag unit 100;

FIGS. 11 and 12 are a top view and a cross sectional view of a second step of deployment of the lower edge airbag 109, upper edge airbag 108, and the lateral edge airbag 111 of the airbag unit 100;

FIGS. 13 and 14 are a top view and a cross sectional view of a third step of deployment of the lower edge airbag 109, upper edge airbag 108, and the lateral edge airbag 111 of the airbag unit 100; and FIGS. 15 and 16 are a top view and a cross sectional view of a fourth step of deployment of the lower edge airbag 109, upper edge airbag 108, and the lateral edge airbag 111 of the airbag unit 100.

DETAILED DESCRIPTION

Hereinafter, the implementations of the present disclosure will be described with reference to the accompanying drawings.

<A First Implementation>

Figure 1A:
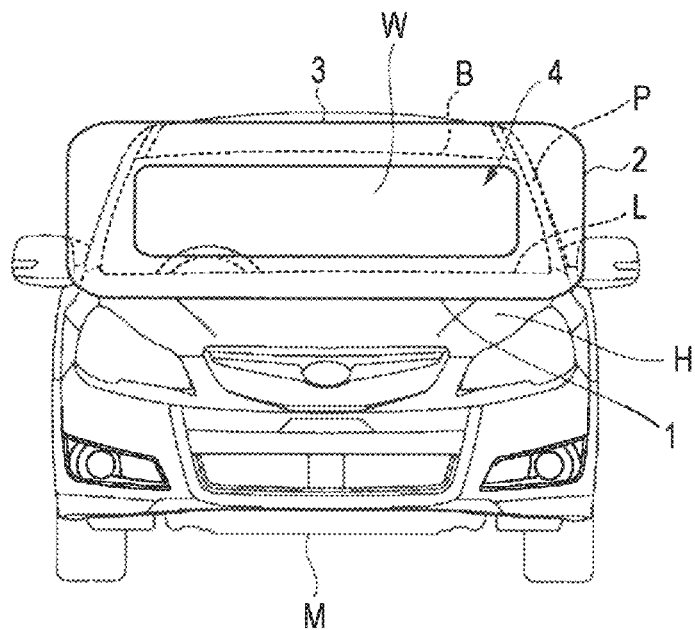
FIGS. 1A and 1B illustrate the configuration of an external airbag according to a first implementation of the present disclosure.
Figure 1B:
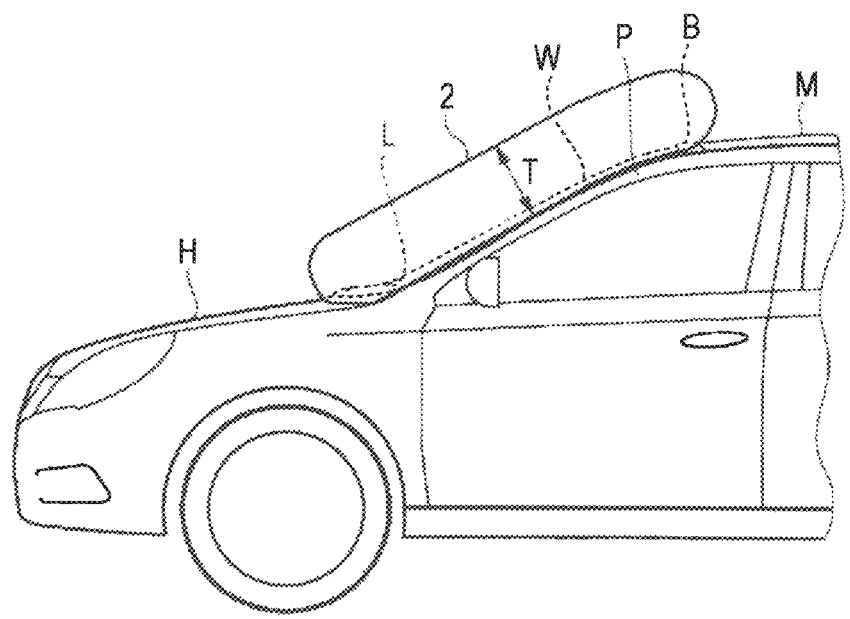

FIGS. 1A and 1B illustrate the configuration of an external airbag according to a first implementation of the present disclosure. The external airbag is deployed so as to surround windshield W of automobile M along the edge, and includes a lower edge bag 1 that is deployed so as to extend along the lower edge of the windshield W, on the front side of the windshield W, lateral edge bags 2 in a pair that are deployed so as to extend along both lateral edges of the windshield W, on the front side of the windshield W, and an upper edge bag 3 that is deployed so as to extend along the upper edge of the windshield W, on the front side of the windshield W.

It is to be noted that in the automobile M, the windshield W is provided rearwardly from the lower edge to the upper edge in an inclined manner, front pillars P in a pair are provided along both lateral edges of the windshield W in an inclined manner, and a roof panel is disposed rearwardly from the upper edge of the windshield W. In addition, cowl panel L is disposed along the lower edge of the windshield W and the front edge B (a portion corresponding to the front brace) of the roof panel is positioned along the upper edge of the windshield W, and front hood H is provided so as to project forward from a vicinity of the lower edge of the windshield W and to cover the front of the automobile M.

Figure 2:
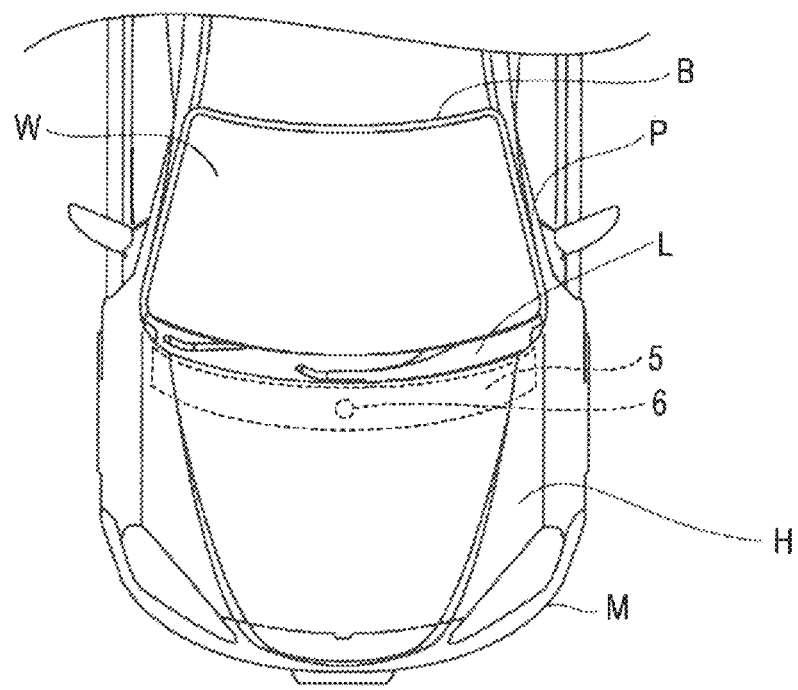
FIG. 2 is a view illustrating the external airbag housed in an automobile.

The lower edge bag 1 is deployed along the cowl panel L so as to cover the cowl panel L from the front side, and both ends of the lower edge bag 1 are coupled to the lower ends of the lateral edge bags 2. Also, the lower portion of the lower edge bag 1 is fixed to the automobile M. The upper edge bag 3 is deployed along the front edge B of the roof panel so as to cover the front edge B of the roof panel from the front side, and both ends of the upper edge bag 3 are coupled to the upper ends of the lateral edge bags 2. The lateral edge bags 2 are deployed along the front pillars P so as to cover the front pillars P from the front side. The lower edge bag 1, the pair of lateral edge bags 2, and the upper edge bag 3 are formed so as to project forward from the windshield W with a certain thickness T. In addition, the lower edge bag 1, the lateral edge bags 2, and the upper edge bag 3 have a continuous circular cross section, and the insides which are hollowly formed are coupled so as to communicate with each other. Furthermore, in the inner side of the lower edge bag 1, the lateral edge bags 2, and the upper edge bag 3, there is formed an opening 4 through which the windshield W is exposed. FIG. 2 illustrates an external airbag housed in the automobile M. The external airbag is housed in a folded state in a housing unit 5 disposed below the rear edge of the front hood H that covers the front of the automobile M. The housing unit 5 is provided with an inflator 6 which is coupled to the lower edge bag 1. Deployment gas is injected into the external airbag from the inflator 6 through the lower edge bag 1, and the external airbag is thereby deployed externally of the vehicle through the space between the rear edge of the front hood H and the lower edge of the windshield W.

Figure 3A:
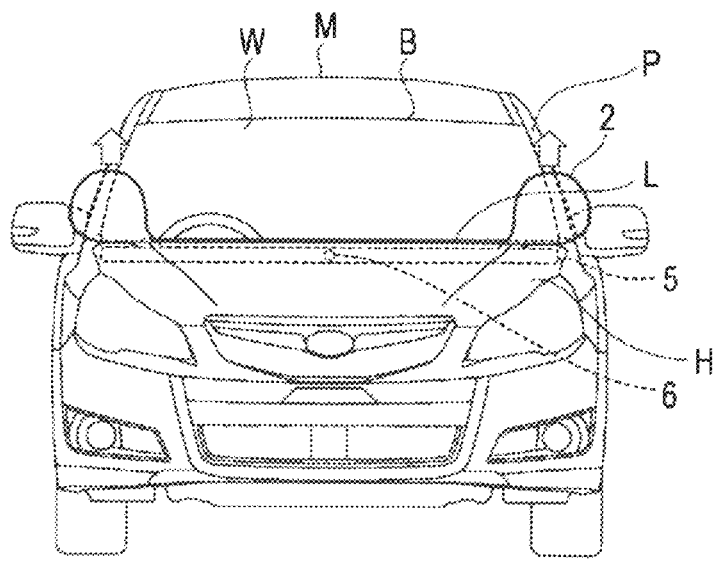
FIGS. 3A to 3C are views illustrating the manner in which the external airbag is deployed.
Figure 3B:
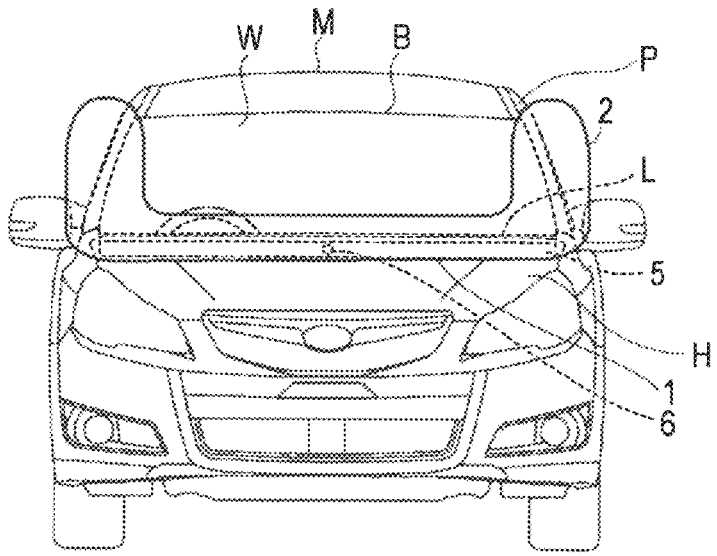
Figure 3C:
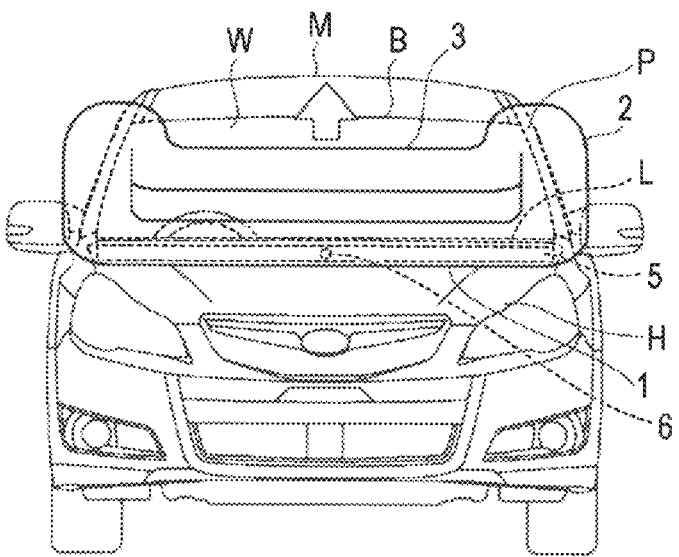

At this point, as illustrated in FIG. 3A, the lateral edge bags 2 are first exposed to the outside of the vehicle and deployed so as to extend upward along the front pillars P. Subsequently, as illustrated in FIG. 3B, while the lateral edge bags 2 are deployed to the vicinity of the upper end of the front pillars P, the lower edge bag 1 is deployed so as to cover the cowl panel L. As illustrated in FIG. 3C, the upper edge bag 3 is lastly exposed to the outside of the vehicle and is deployed so as to move upward along the windshield W. In this manner, as illustrated in FIGS. 1A and 1B, the external airbag is deployed so as to surround the windshield W. It is to be noted that the direction of deployment of the external airbag is controllable, for instance, by the direction of deployment gas injected from the inflator 6, the shape of the external airbag, and the manner in which the external airbag is folded. Also, the order of deploying the external airbag is controllable by the manner of folding, and for instance, by folding the external airbag so that the upper edge bag 3 is positioned in the inner side of the lower edge bag 1 and the lateral edge bags 2, the upper edge bag 3 is deployable after the lower edge bag 1 and the lateral edge bags 2 are deployed.

Next, an example will be described in which the external airbag is deployed to protect a subject to be protected. First, when a subject to be protected such as a pedestrian or a bicycle rider approaches the front of the automobile M, a detection sensor (not illustrated) mounted on the automobile M detects the subject to be protected. As a detection sensor, it is possible to utilize, for instance, a sensor that detects a subject to be protected by emitting laser to the subject, and a sensor that detects a subject based on an image obtained from a camera. When it is determined that the subject to be protected collides with the automobile M based on detection information obtained from the detection sensor, as illustrated in FIG. 2, deployment gas is injected from the inflator 6 into the external vehicle airbag housed in the housing unit 5.

Here, because the front edge B of the roof panel is disposed at a rear position compared with the front pillars P and the cowl panel L, a subject to be protected, who has collided with the front of the automobile M and is thrown rearwardly, reaches the front pillars P and the cowl panel L in a shorter time than the subject reaches the front edge B of the roof panel. As illustrated in FIGS. 3A to 3C, in the external airbag, the lateral edge bags 2 and the lower edge bag 1, which cover the front pillars P and the cowl panel L reached by the subject in a shorter time, are first deployed, and subsequently, the upper edge bag 3, which covers the front edge B of the roof panel reached by the subject in a longer time, is deployed. In this manner, the portions of the external airbag are successively deployed in the ascending order of the time taken for the subject to be protected to reach the portions, and thus the subject may be reliably protected.

Also, since the lower edge bag 1 and the lateral edge bags 2 are deployed along the lower edge and the lateral edges of the windshield W, respectively, the deployment may be made without blocking the view of a driver of the automobile M at all. Although the upper edge bag 3 blocks the view of a driver when moving upward along the windshield W, the blocking occurs only for a moment when the upper edge bag 3 passes through in front of the driver, and thus interference to the view of the driver may be suppressed to a minimum. Furthermore, after the deployment of the external airbag, the opening 4 allows the view of the driver to be secured. In addition, the lower edge bag 1, the lateral edge bags 2, and the upper edge bag 3 are coupled at their ends and thus are supported to each other, and the posture at the time of deployment is stable, which allows quick deployment and the posture may be maintained unchanged even after the deployment.

Figure 4:
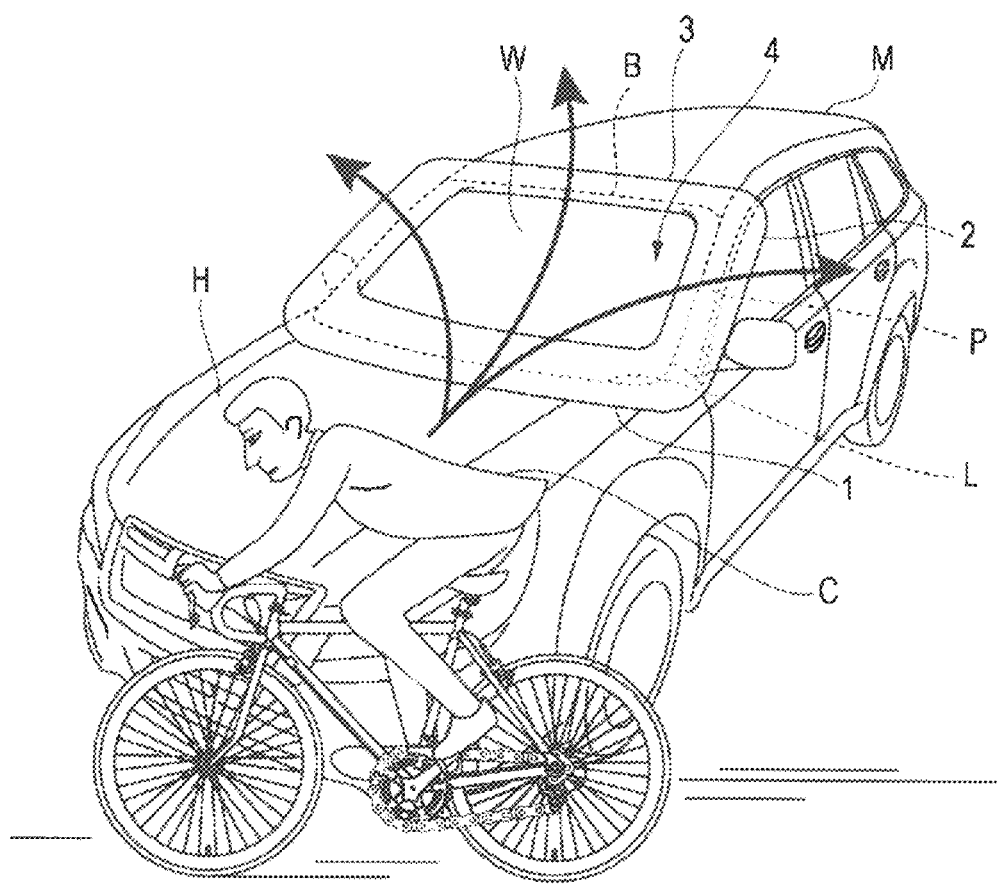
FIG. 4 is a view illustrating the manner in which a subject to be protected riding a bicycle collides with an automobile.

In this manner, as illustrated in FIGS. 1A and 1B, the external airbag is deployed so as to surround the windshield W along the edges. Here, a subject to be protected who has collided with the automobile M may be thrown into a wide range. Particularly when the automobile M collides with a subject to be protected C riding on a bicycle as illustrated in FIG. 4, the subject to be protected C may be thrown into a wide range rearwardly because the subject has a high centroid position. For instance, the subject to be protected C thrown upward over the automobile M may collide with the front edge B of the roof panel then may be further thrown far rearwardly of the roof panel. Also, the subject to be protected C thrown laterally of the automobile M may collide with the side of a front pillar P then may be thrown further laterally, and may have a secondary collision with an oncoming vehicle.

Figure 5:
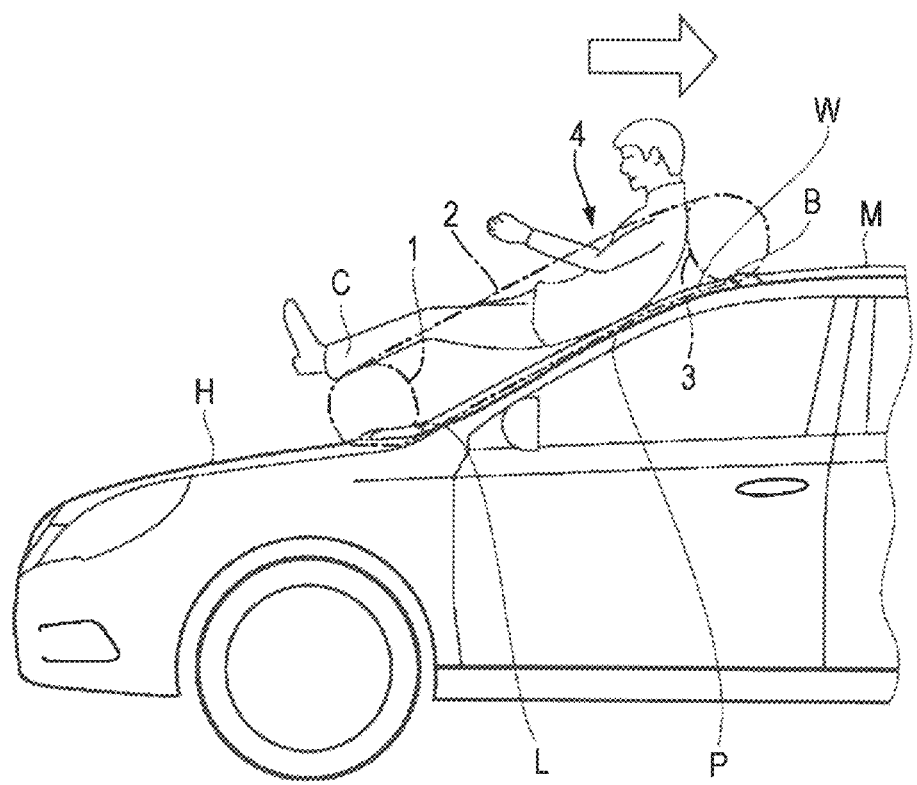
FIG. 5 is a side view illustrating the manner in which the subject to be protected is received.

Thus, by deploying the external airbag so as to surround the windshield W as described above, it is possible to receive the subject to be protected C thrown into a wide range. For instance, as illustrated in FIG. 5, the subject to be protected C thrown toward the front edge B of the roof panel gets caught into the opening 4 and is received as it is by the inner wall of the upper edge bag 3. At this point, the pressure from the subject to be protected C thrown rearwardly is absorbed by the upper edge bag 3, and the entire external airbag is deformed so as to encompass the subject to be protected C, depending on the pressure from the subject to be protected C, thereby making it possible to reliably receive the subject to be protected C. Similarly, also when the subject to be protected C is thrown toward the front pillars P, the subject to be protected C is received by the lateral edge bags 2 and the pressure of the lateral edge bags 2 applied from the inner side to the outer side is absorbable by the lateral edge bags 2.

Here, the lateral edge bags 2 and the upper edge bag 3 are preferably deployed so as to project forwardly from the windshield W with thickness T that allows the subject to be protected C to get caught inside. This reduces the risk of the subject to be protected C being thrown over the lateral edge bags 2 and the upper edge bag 3 to the outside of the opening 4. In this manner, the subject to be protected C thrown into a wide range is reliably received by the upper edge bag 3 and the lateral edge bags 2, thereby making it possible to reduce the risk of a secondary collision of the subject to be protected C with an oncoming vehicle.

Furthermore, the lower edge bag 1, the lateral edge bags 2, and the upper edge bag 3 are provided so as to cover the cowl panel L, the front pillars P, and the front edge B of the roof panel which are formed solidly in the automobile M, and thus direct collision of the subject to be protected C with these solidly formed parts may be avoided.

According to the present implementation, it is possible to avoid direct collision of the subject to be protected C with the cowl panel L, the front pillars P, and the front edge B of the roof panel and simultaneously, it is possible to protect the subject to be protected C who is thrown in various directions, in a wide range.

<A Second Implementation>

Although the lower edge bag 1, the lateral edge bags 2, and the upper edge bag 3 are formed to have a continuous circular cross section in the first implementation, it is sufficient to be able to receive the subject to be protected C, and the cross section is not limited to be circular.

Figure 6A:
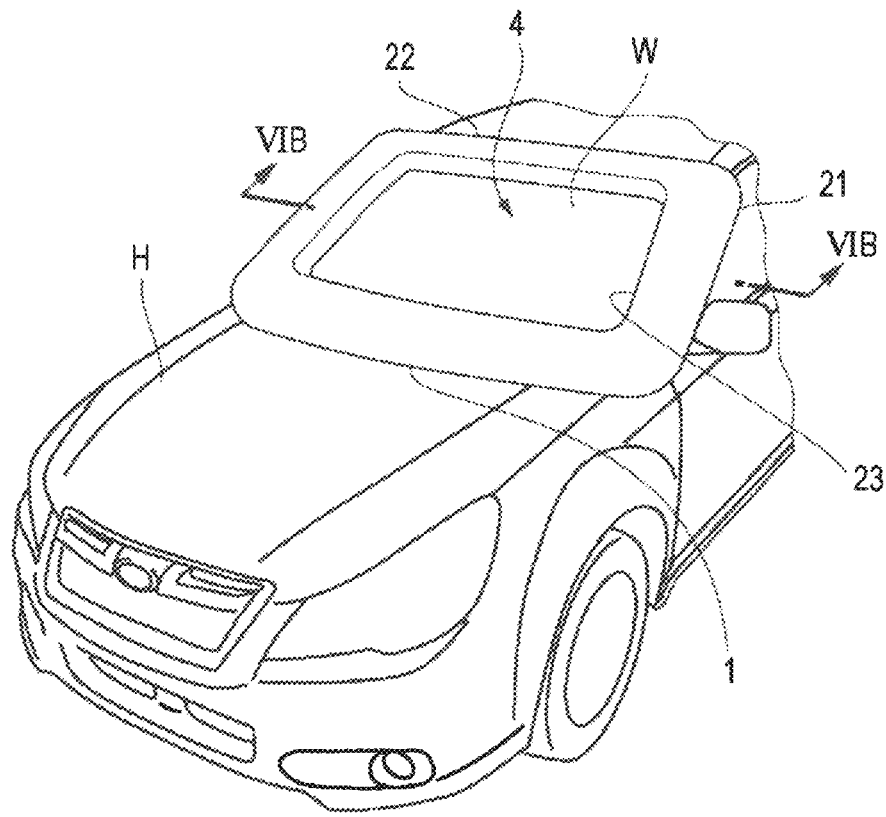
FIGS. 6A and 6B illustrate the configuration of an external airbag according to a second implementation of the present disclosure.
Figure 6B:
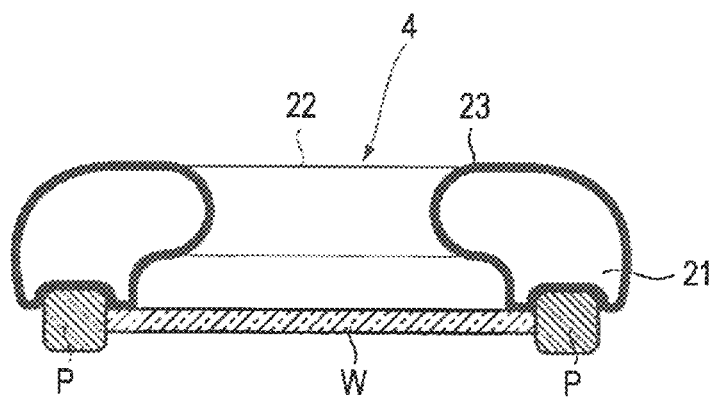

For instance, as illustrated in FIGS. 6A and 6B, instead of the lateral edge bags 2 and the upper edge bag 3 in the first implementation, lateral edge bags 21 in a pair and an upper edge bag 22 may be disposed. The lateral edge bags 21 and the upper edge bag 22 are formed so that end 23 thereof in the direction forwardly projecting from the windshield W is bent inwardly. Consequently, when a subject to be protected C thrown toward the front pillars P and the front edge B of the roof panel is received by the lateral edge bags 21 and the upper edge bag 22, it is possible to reliably support the subject to be protected C thrown outwardly from the opening 4 and to reduce the risk of the subject to be protected C being thrown over the lateral edge bags 21 and the upper edge bag 22 to the outside of the opening 4.

According to the present implementation, the end 23 of the lateral edge bags 21 and the upper edge bag 22 is formed to be bent inwardly, and thus it is possible to reliably support the outwardly thrown subject to be protected C and to keep the subject to be protected C in the opening 4.

<A Third Implementation>

Although the lower edge bag, the lateral edge bags, and the upper edge bag are formed with an uniform thickness T in the first and second implementations, the thickness T may be changed according to the location of disposition.

Figure 7:
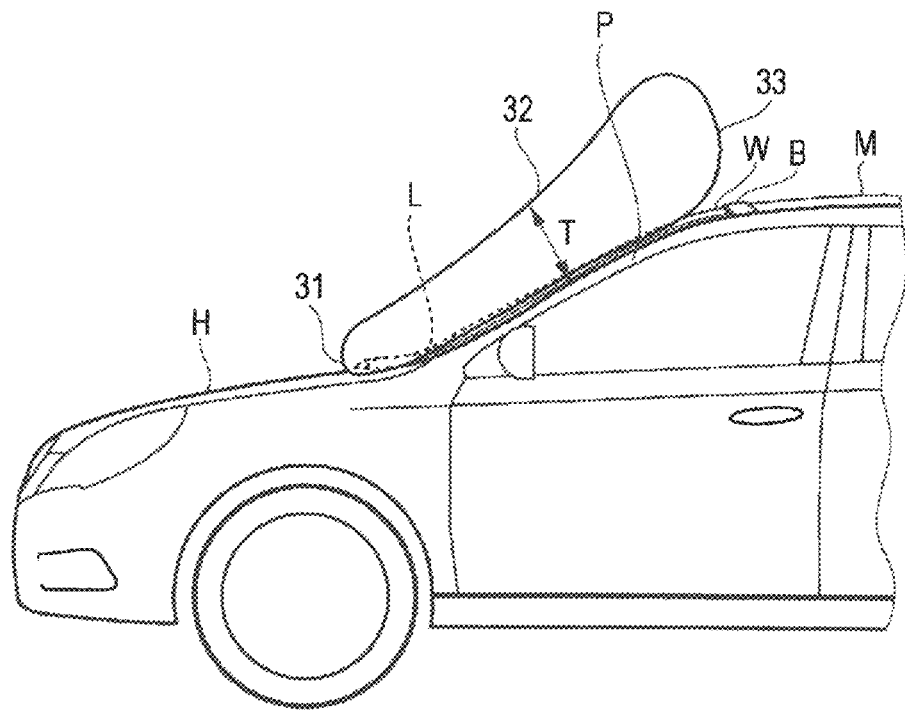
FIG. 7 is a side view illustrating the configuration of an external airbag according to a third implementation of the present disclosure.

For instance, as illustrated in FIG. 7, instead of the lower edge bag 1, the lateral edge bags 2, and the upper edge bag 3 in the first implementation, a lower edge bag 31, lateral edge bags 32 in a pair, and an upper edge bag 33 may be disposed. The lower edge bag 31 and the upper edge bag 33 have different values of thickness T forwardly protruding from the windshield W and are formed so that the thickness T of the upper edge bag 33 is greater than the thickness T of the lower edge bag 31. In addition, the thickness T of the lateral edge bags 32 is formed to gradually increase from the lower end coupled to the lower edge bag 31 to the upper end coupled to the upper edge bag 33. That is, the external airbag is formed so that the thickness T forwardly protruding from the windshield W gradually increases from the lower edge side to the upper edge side of the windshield w.

According to the present implementation, reduced thickness T in part allows the speed of deployment to be improved and a housing space to be decreased, and increased thickness T of the upper edge bag 33 allows a function of receiving the subject to be protected C to be maintained. It is to be noted that the thickness T of the external airbag is preferably changed according to the direction in which the subject to be protected C is thrown. For instance, when it is probable that the subject to be protected C is thrown toward the lower edge of the windshield W, the external airbag may be formed so that the thickness T gradually increases from the upper edge side to the lower edge side of the windshield W.

Figure 8:
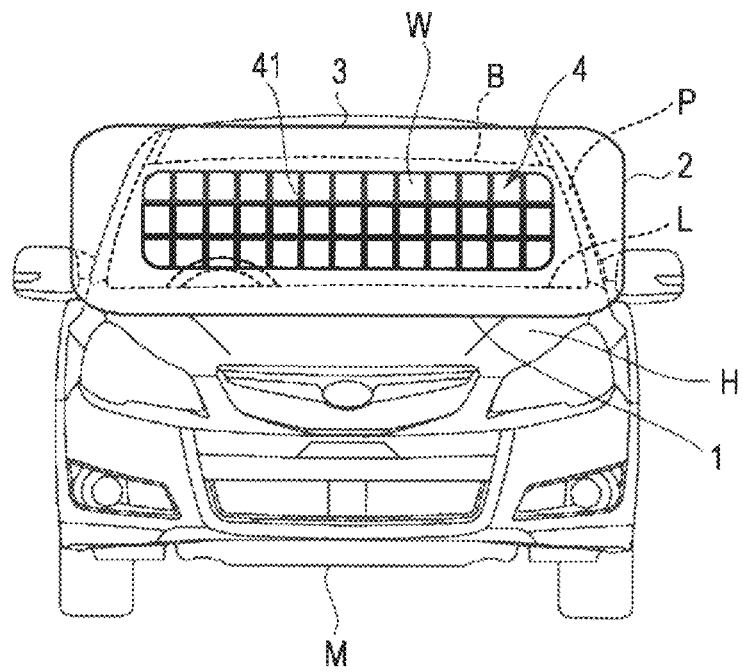
FIG. 8 is a front view illustrating the configuration of an external airbag according to a modification of the first to third implementations of the present disclosure.

It is to be noted that linear members, which extend to cross the opening 4, may be provided in the external airbag in the first to third implementations. For instance, as illustrated in FIG. 8, linear members 41 crossing the opening 4 in a net pattern may be provided. The linear members 41 are provided so as to connect the vicinities of central portions, in the direction of the thickness T, of the inner walls of the lower edge bag 1, the lateral edge bags 2, and the upper edge bag 3. Consequently, the subject to be protected C thrown into a wide range may be received by the upper half of the inner walls of the lower edge bag 1, the lateral edge bags 2, and the upper edge bag 3, and direct collision of the subject to be protected C with the windshield W may be protected by the linear members 41. In addition, disposition of the linear members 41 in a net pattern allows the view of a driver to be secured. It is to be noted that the linear members 41 may be composed of, for instance, a tether, the ground fabric of the external airbag, or a thin airbag.

<A Fourth Implementation>

FIGS. 9-16 exemplarily depict the deployment (i.e., inflate, expose to the outside of the vehicle, etc.) of a lower edge airbag 109, an upper edge airbag 108, and lateral edge airbags 111 of an airbag unit 100 via three inflators 114, 115, 116. Each of the lower edge airbag 109, an upper edge airbag 108, and lateral edge airbags 111 is inflated by each of the inflators 114, 115, 116 separately. The deployment of the airbags of the airbag unit 100 is controlled by a direction of deployment gas from the inflators and the manner in which the external airbag is folded (as described later).

Figure 9:
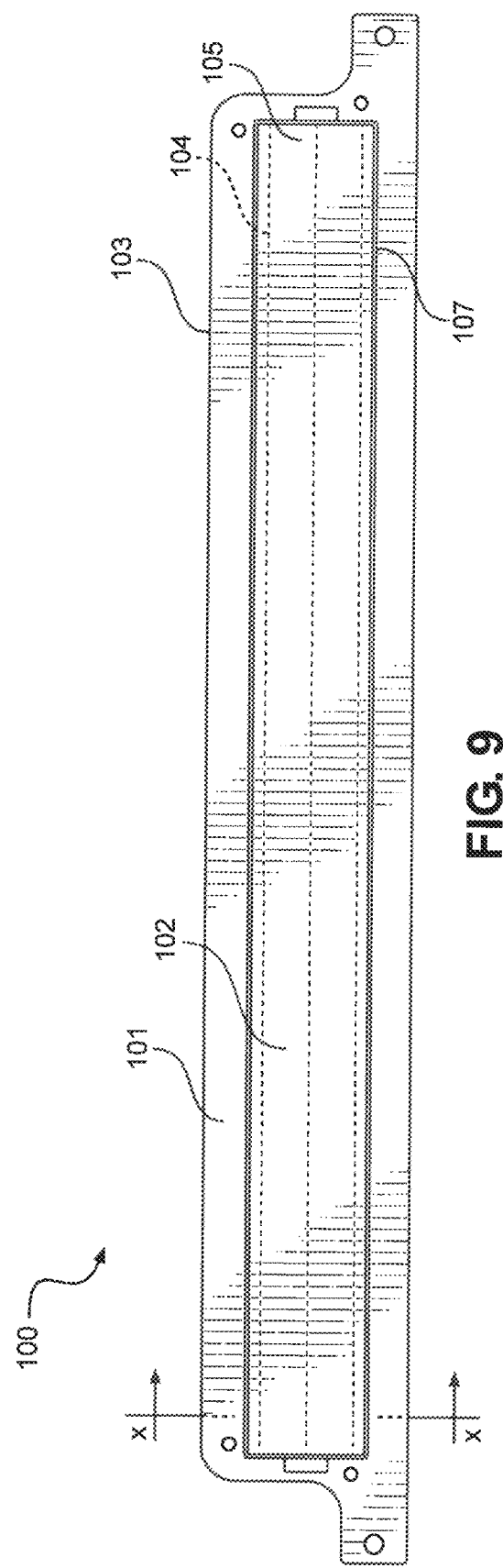
FIGS. 9-16 illustrate a configuration of an external airbag according to a fourth implementation of the present disclosure.
Figure 10:
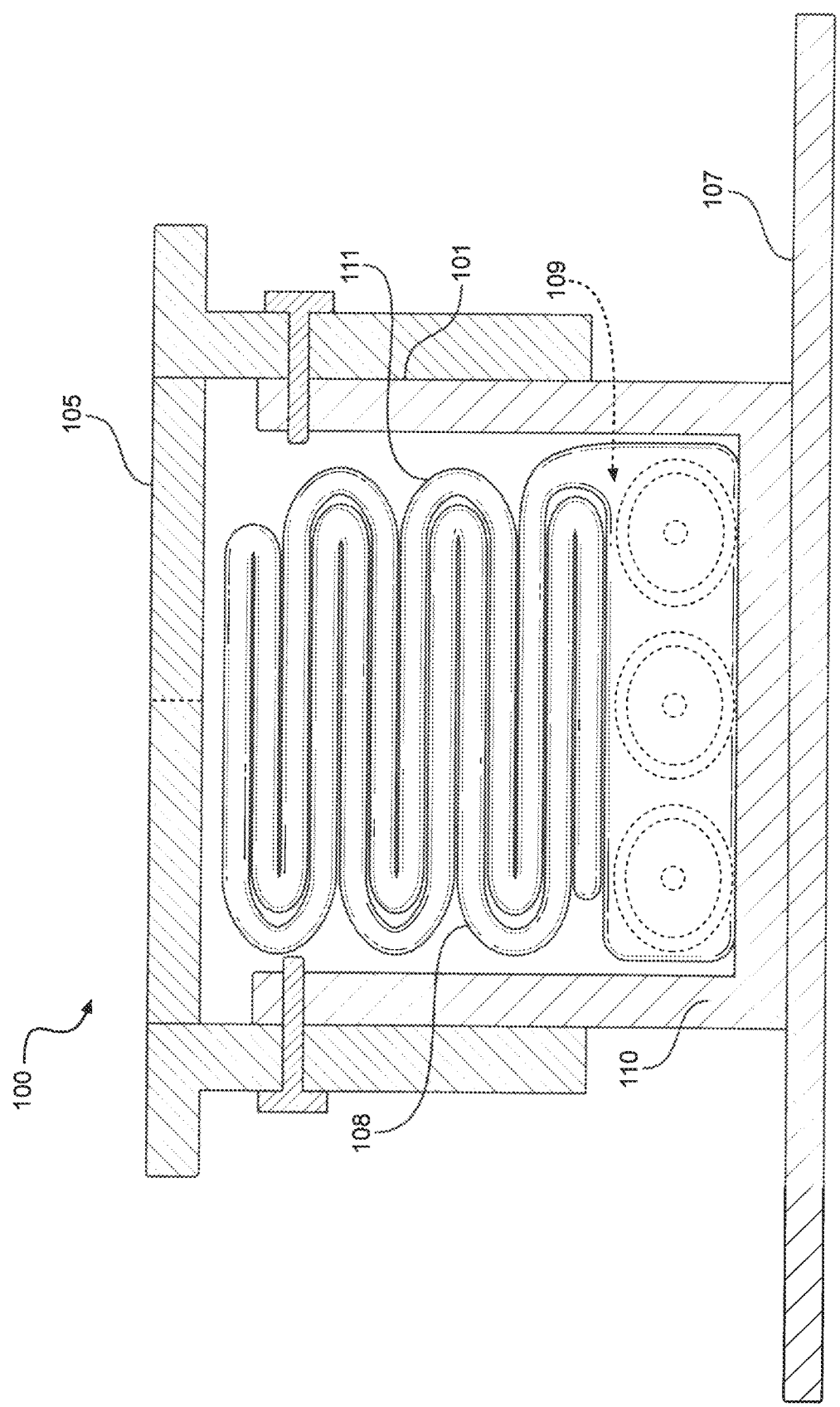

Referring generally to FIGS. 9 and 10 which depict a first step of the deployment of the airbag according to the fourth implementation, the airbag (108/109/111) is housed in the airbag unit. The airbag is housed in the airbag cover 101 and is attached to the inflators. The airbag cover 101 is attached to a bracket 107 which is fastened to the vehicle body via a fastening piece 104 in an opening to fasten the bracket to the vehicle body. A cover lid member 105 is provided to enclose the airbag (108/109/111) in the airbag cover 101. The cover lid member 105 is configured to be openable when the airbag (108/109/111) is deployed via the inflators 114, 115, 116. The cover lid member 105 can be attached to the airbag cover 101 via pins, welding, a fixed attached, etc. In one embodiment, the cover lid member 105 is configured to have flaps with separation along the center of the airbag unit 100 such that when the airbag deploys, the flaps open up (as shown in FIG. 12).

Figure 11:
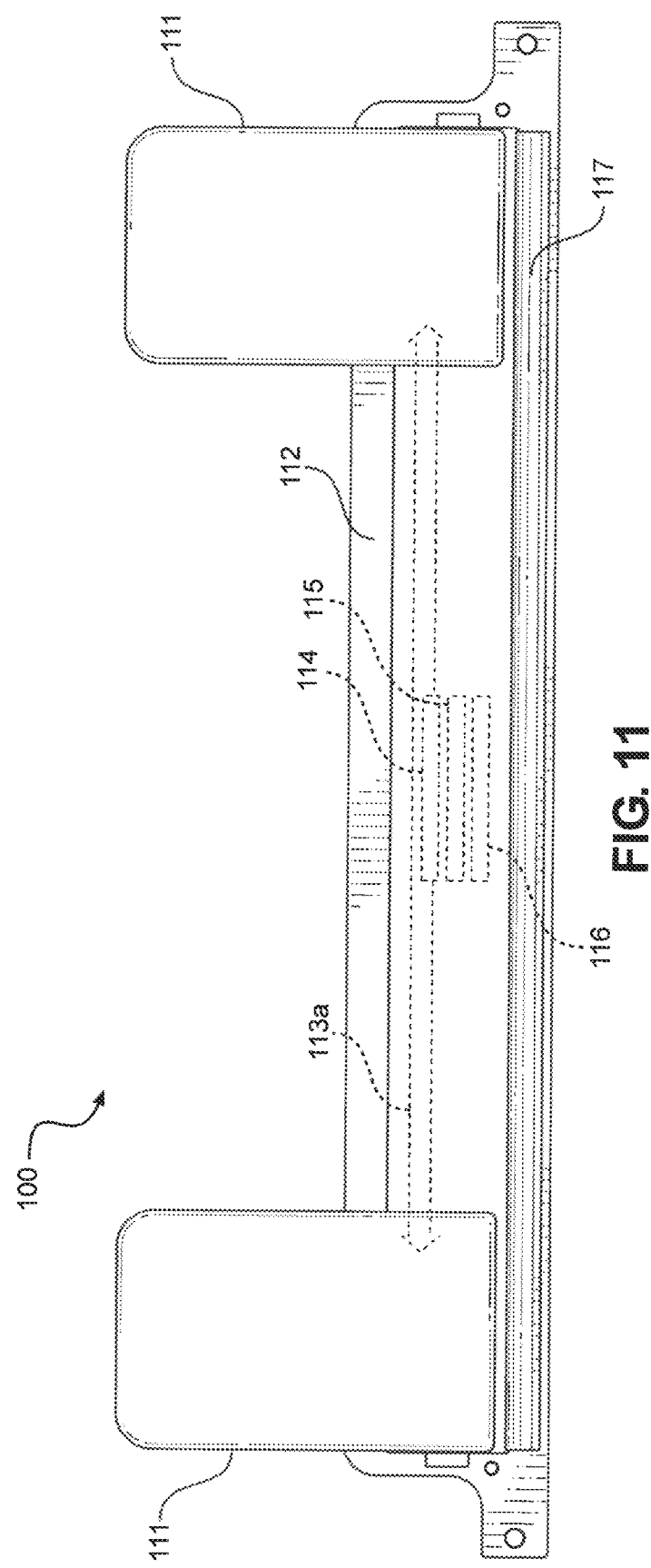
Figure 12:
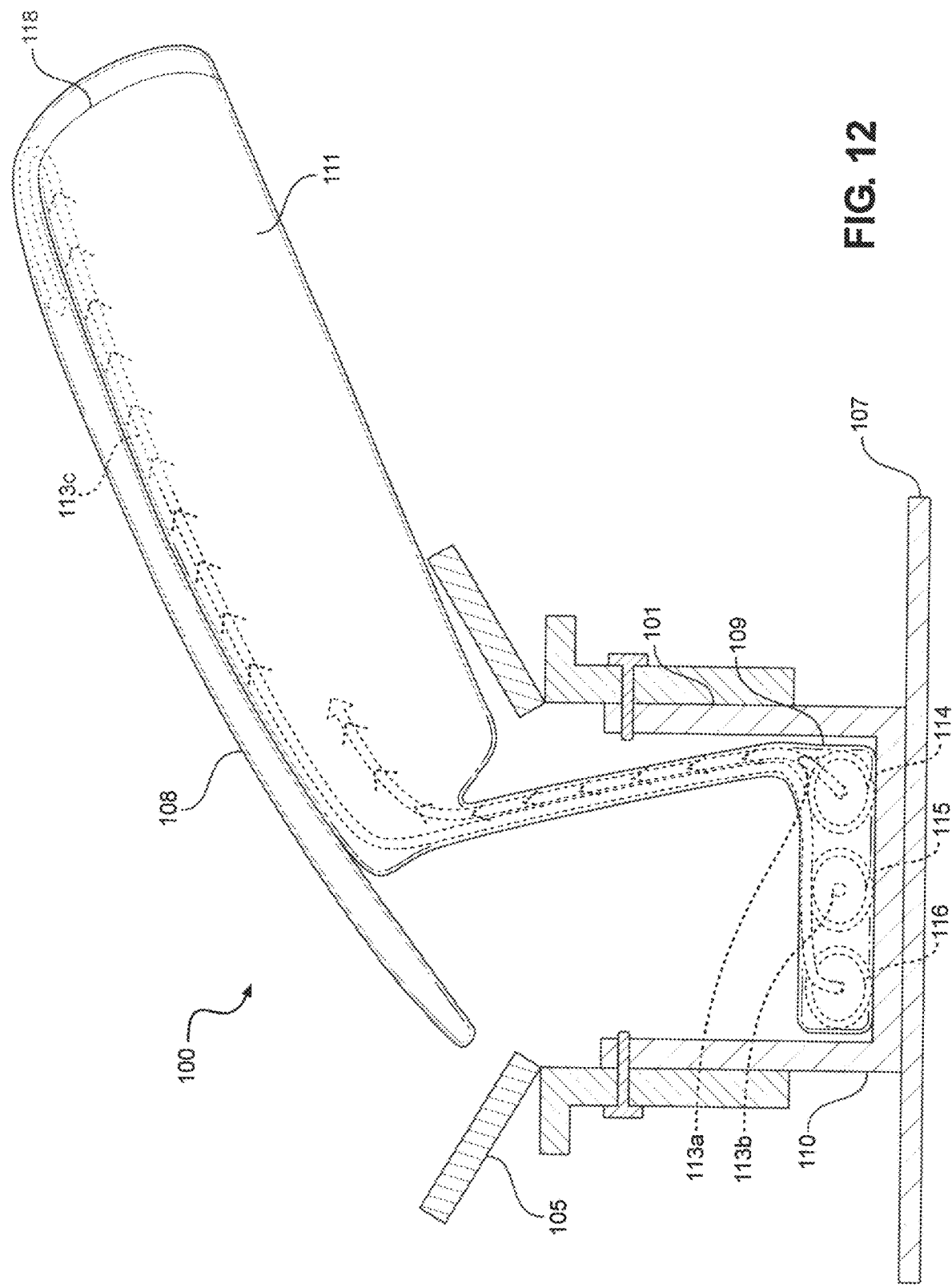

Referring generally to FIGS. 11 and 12 which depict a second step of the deployment of the airbag according to the fourth implementation, the first inflator 114 deploys gas in a first pathway 113*a* such that the lateral edge bags 111 deploys from the airbag unit 100 by exiting the airbag cover 105 via a part of cover lid member cleaved 112/117 (e.g., the opened parts of the cover lid member 105) by deployment of lateral edge airbags 111.

As depicted in FIG. 12, the deployment gas is deployed along the first pathway 113*a* from the first inflator 114 such that the deployment gas causes the lateral edge bag 111 to inflate first. That is, the deployment gas passes through the first pathway 113*a* without inflating the lower edge airbag 109 or the upper edge airbag 108. To facilitate the first deployment of the lateral edge airbags 111, a first division wall 120 and a second division wall 118 are provided to separate the airbags from each other (i.e., the second division wall 118 is provided between the lateral edge airbags 111 and the upper edge airbag 108 and the first division wall 120 is provided between the lower edge airbag 109 and the lateral edge airbags 111). The division walls 118/120 may be formed of the same material as the airbag body, for example, of cloth, plastics or the like.

The division walls 118/120 are configured such that the first/third pathways 113*a*/113*c* can transport deployment gas between the airbags through the division walls 118/120.

As shown in FIG. 12, a part of cover lid member 105 is cleaved by deployment of lateral edge airbags 111. Thus, by the first inflator 114 deploying deployment gas along the first pathway 113*a* through the first dividing wall 120 and inflating the lateral edge airbags 111, the lateral edge airbags can be deploys first on at least the part of the front pillars (i.e., before the lower edge airbag 109 and the upper edge airbag 108).

Figure 13:
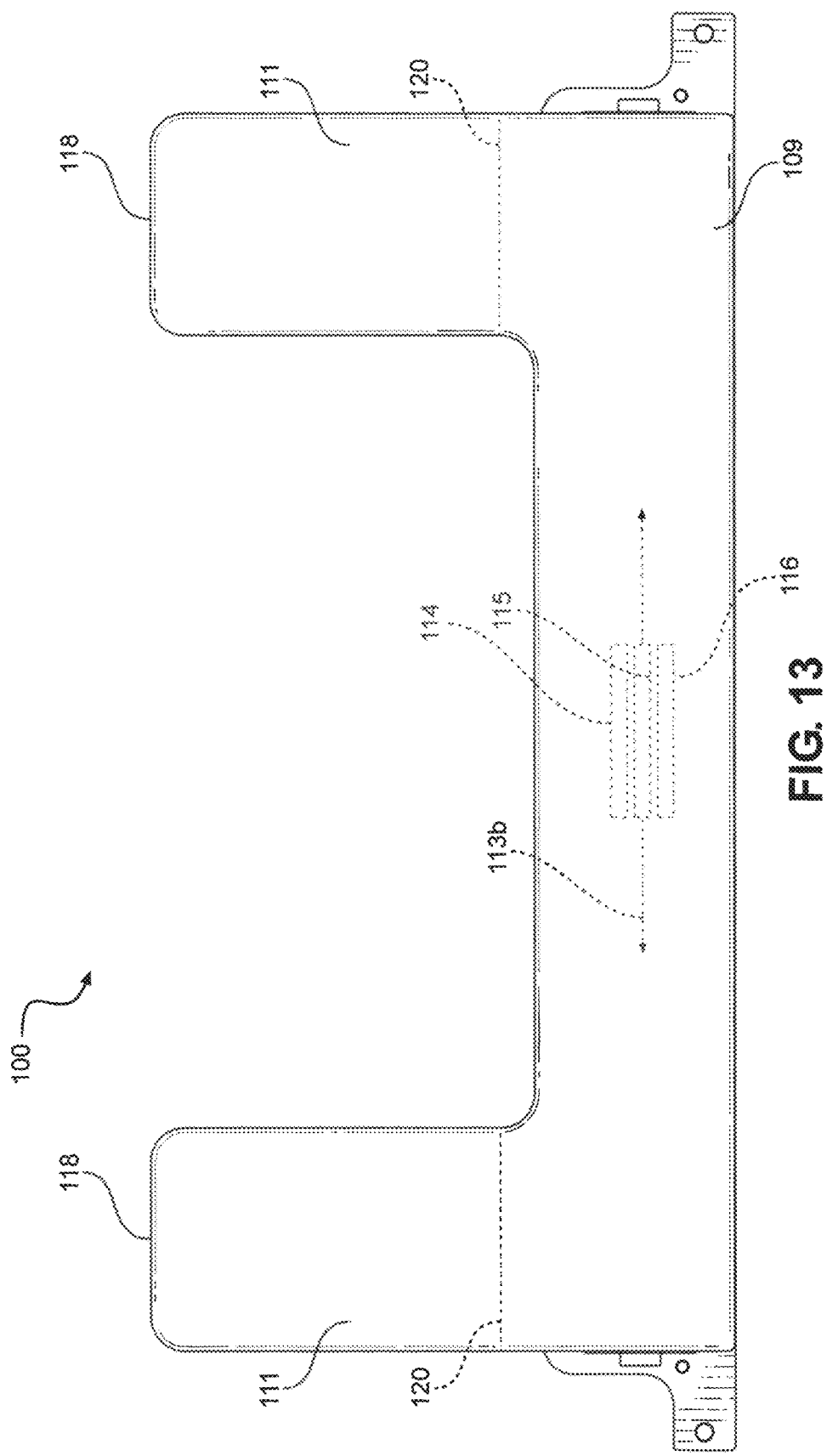
Figure 14:
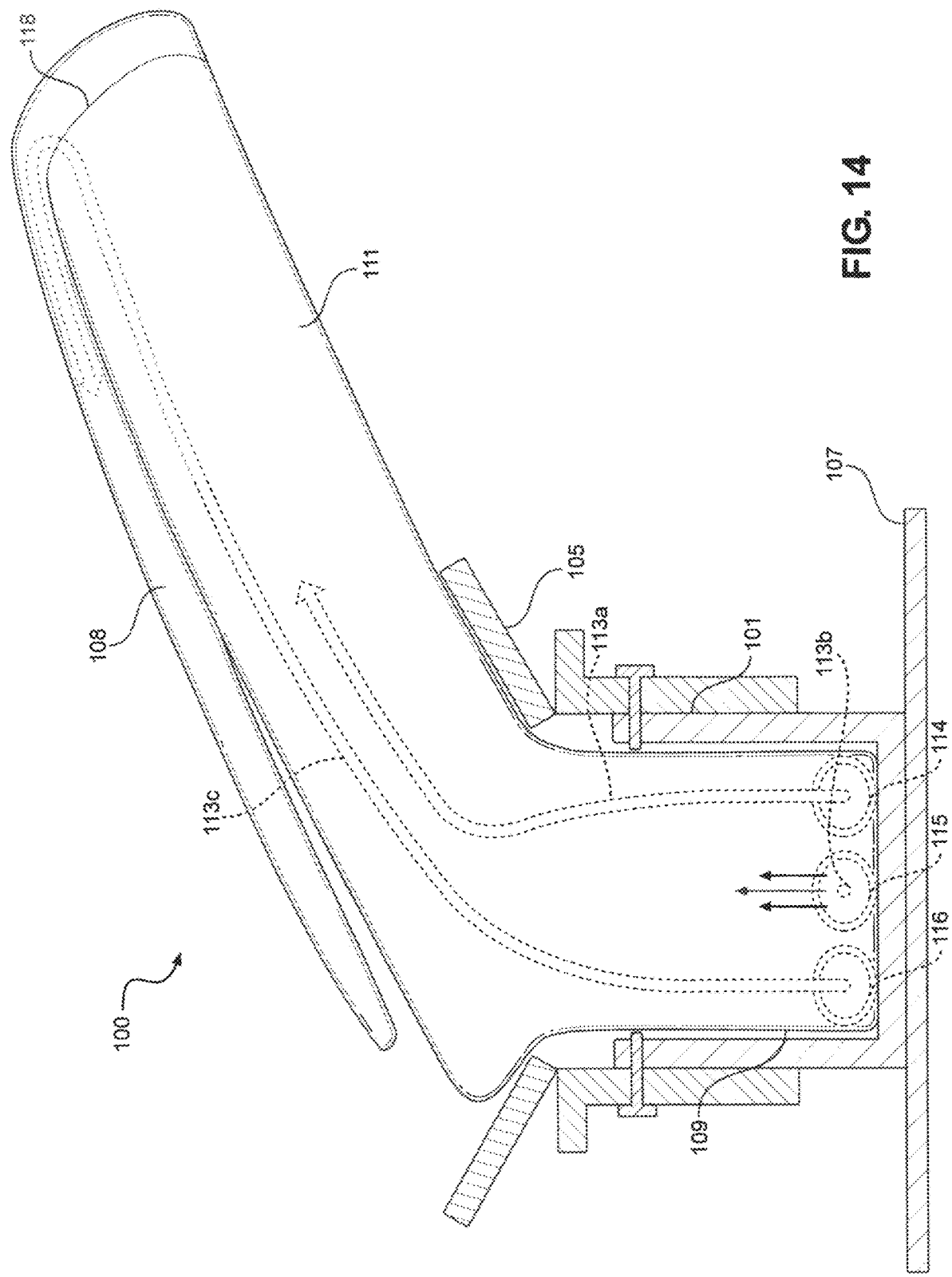

Referring generally to FIGS. 13 and 14 which depict a third step of the deployment of the airbag according to the fourth implementation, the second inflator deploys deployment gas via a second pathway 113*b* to the lower edge airbag 109. For example, as shown in FIG. 13, the second inflator 115 deploys the deployment gas laterally along the second pathway 113*b* to inflate the lower edge airbag 109 outwardly and upwardly to fill up the area inside the airbag cover 101. The lower edge airbag 109 is deployed on at least a part of the cowl panel after the lateral edge bags 111 are deployed on at least the part of the front pillars. The first division wall 120 separates the airflow from the second pathway 113*b* from the lateral airbags 111.

Figure 15:
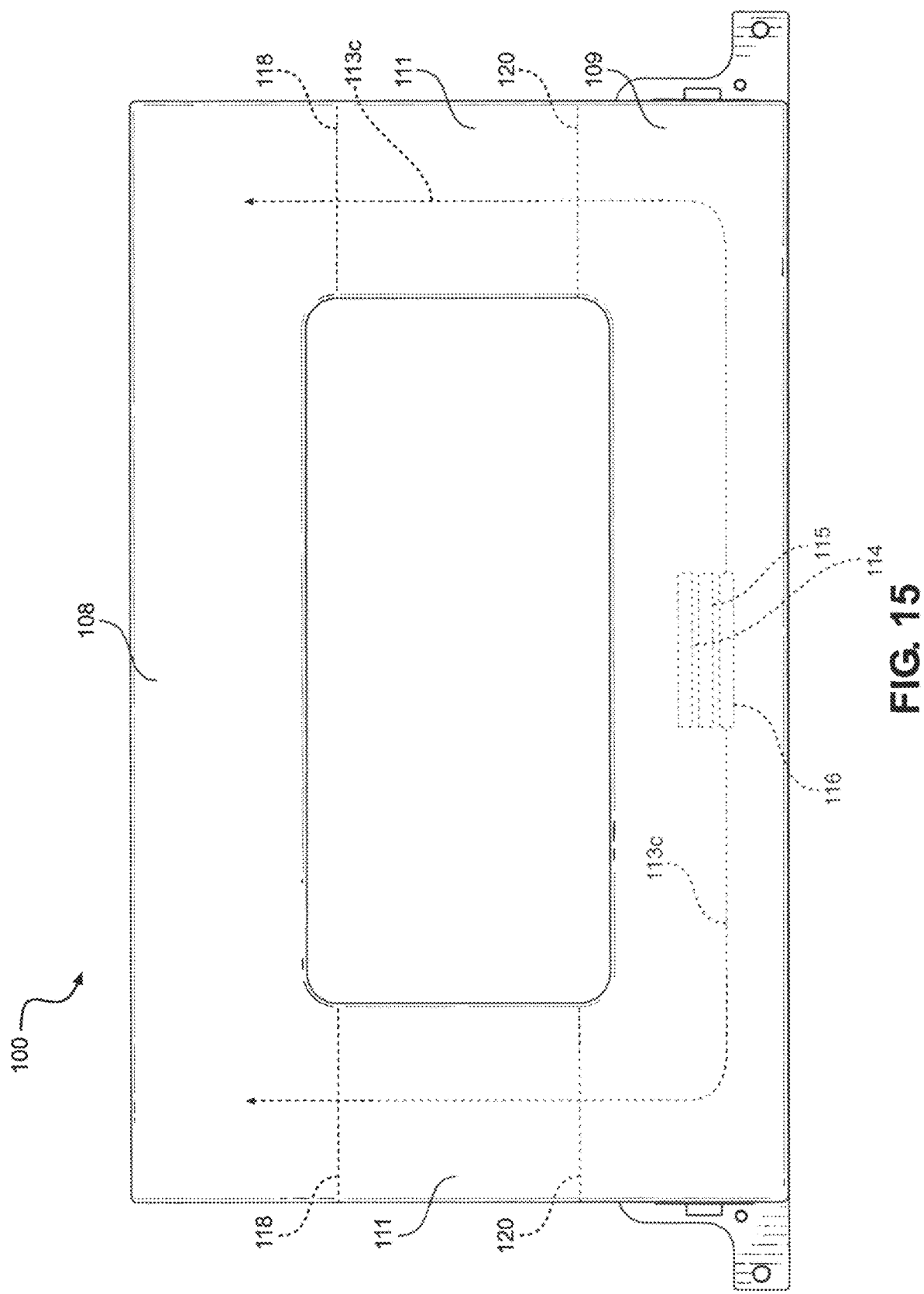
Figure 16:
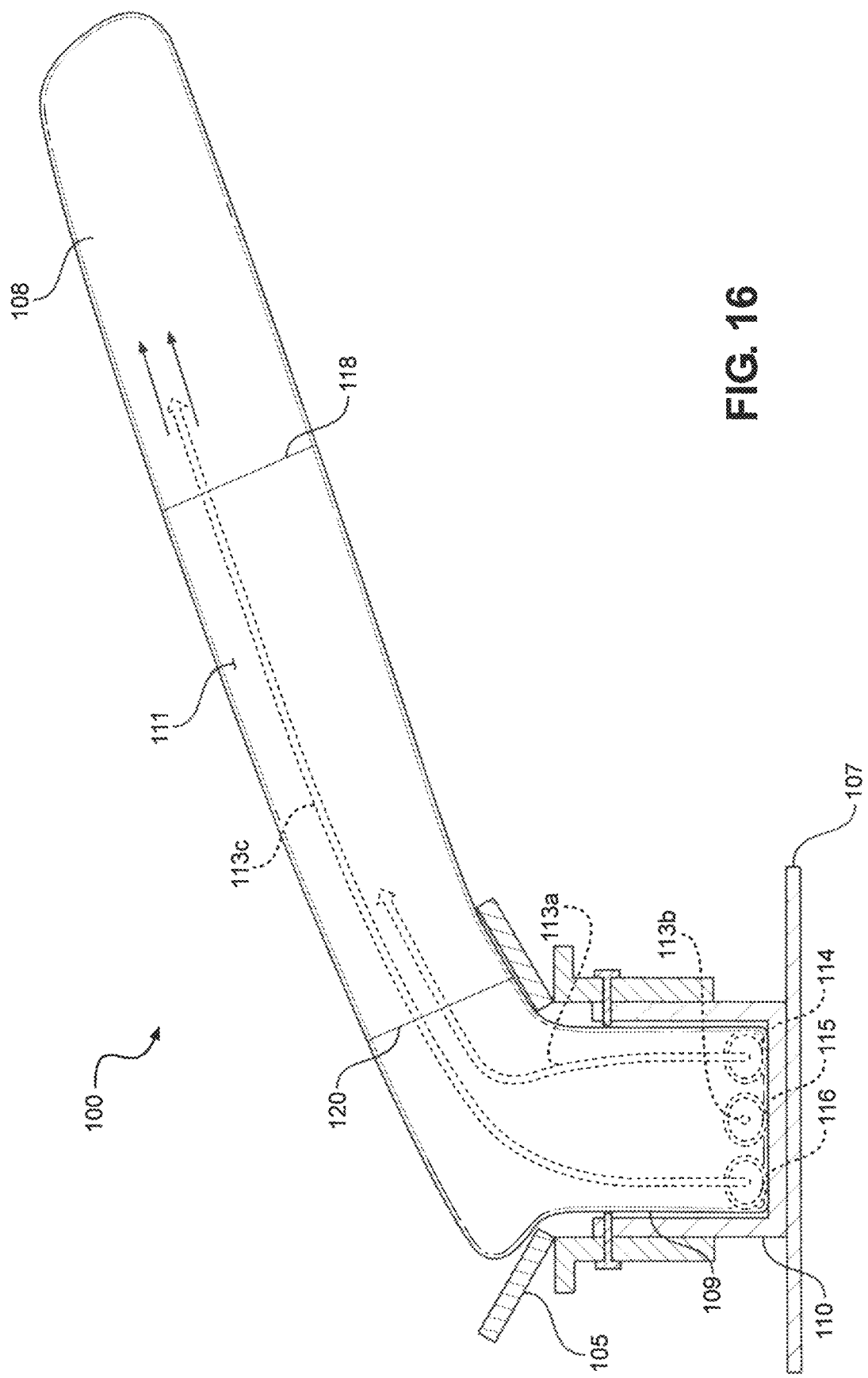

Referring generally to FIGS. 15 and 16 which depict a fourth step of the deployment of the airbag according to the fourth implementation, the third inflator 116 deploys deployment gas along the third pathway 113*c* to inflate the upper edge bag 108. The third pathway 113*c* passes through the first division wall 120 and the second division wall 118. Thereby, the upper edge bag 108 is deployed on at least a part of the front edge of a roof panel after the lower edge bag is deployed on at least a part of the cowl panel.

Thus, as shown in FIGS. 9-16, the airbag (108/109/111) can be folded and housed in a vicinity of the lower edge of the windshield in a manner that the lateral edge bags 111 are deployed prior to the deployment of the lower edge bag 109 such that that the lateral edge bags 111 cover the front pillars. In other words, as shown in FIG. 10, the airbag is folded such that the lateral edge airbags 111 can be deployed first (i.e., on an upper right side of the folded airbag) with the upper edge bag 108 being folded underneath the lateral edge bags 111 such that when the lateral edge bags 111 are deployed, the upper edge bag 108 can be deployed after. And, the lower edge bag 109 is folded beneath the upper edge bag 108 and the lateral edge bags 111 such that the lower edge bag 109 can be deployed after the lateral edge bags. Further, via the pathways (113*a*/113*b*/113*c*), the inflators can selectively inflate the airbags in the preferred order (i.e., lateral edge airbags 111 are inflated via the first pathway 113*a* before the lower edge airbag 109 is inflated via the second pathway 113*b* of which are inflated before the upper edge airbag 108 is inflated via the third pathway 113*c*.

Therefore, the airbag can be folded in a folded state to allow for efficient deployment of the portions of the air bags to better protect a pedestrian during impact.

The invention claimed is:
1. An external airbag comprising:
a lower edge bag that is deployed to extend along a lower edge of a windshield of an automobile so as to cover a cowl panel that is provided along the lower edge of the windshield, on a front side of the windshield;
lateral edge bags in a pair that are deployed to extend along both lateral edges of the windshield so as to cover front pillars in a pair that are provided along the both lateral edges of the windshield, on the front side of the windshield; and
an upper edge bag that is deployed to extend along an upper edge of the windshield so as to cover a front edge of a roof panel, on the front side of the windshield, the front edge being provided along the upper edge of the windshield, wherein both ends of the lower edge bag are coupled to lower ends of the lateral edge bags in the pair, and the upper edge bag is coupled to upper ends of the lateral edge bags in the pair, wherein the external airbag is housed in a folded state in a vicinity of the lower edge of the windshield, wherein the external airbag in the folded state is configured in a manner that:

the lateral edge bags are deployed on at least a part of the front pillars;

the lower edge bag is deployed on at least a part of the cowl panel after the lateral edge bags are deployed on at least the part of the front pillars; and the upper edge bag is deployed on at least a part of the front edge of the roof panel after the lower edge bag is deployed on at least a part of the cowl panel, and wherein the external airbag further comprises:

a first division wall disposed between the lower edge bag and the lateral edge bags and configured to separate inflation of the lower edge bag and the lateral edge bags; and a second division wall disposed between the upper edge bag and the lateral edge bags and configured to separate inflation of the upper edge bag and the lateral edge bags.

2. An automobile comprising the external airbag according to claim 1.

3. The external airbag according to claim 1, wherein the deployment comprises an inflation of the airbag and an exposure of the airbag to an outside of the vehicle.

4. The external airbag according to claim 1, wherein the external airbag is deployed by deploying gas from inflators outwardly such that an inflation gas fills the lateral edge bags first, then the inflation gas is deployed perpendicular to a cross section of the lower edge bag to inflate the lower edge bag after the lateral edge bags, and then the inflation gas is deployed through the lateral edge bags to the upper edge bag.

5. The external airbag according to claim 1, further comprising:

a first inflator for deploying deployment gas into the lateral edge bags via a first pathway that passes through the lower edge bag and the first division wall into the lateral edge bags;

a second inflator for deploying deployment gas into the lower edge bag via a second pathway after the first inflator has deployed the lateral edge bags; and a third inflator for deploying deployment gas into the upper edge bag, after the first inflator and the second inflator have deployed the lateral edge bags and the lower bag, via a third pathway that passes through the lower edge bag, the first division wall, the lateral edge bags, and the second division wall into the upper edge bag.

6. A method for deploying the external airbag of claim 1, the method comprising:

folding the external airbag in the folded state, the folded state being configured in a manner such that an inflator deploys:

the lateral edge bags on at least a part of the front pillars;

the lower edge bag on at least a part of the cowl panel after the lateral edge bags are deployed on at least the part of the front pillars; and the upper edge bag on at least a part of the front edge of a roof panel after the lower edge bag is deployed on at least a part of the cowl panel.

7. An external airbag comprising:

a lower edge bag that is deployed to extend along a lower edge of a windshield of an automobile so as to cover a cowl panel that is provided along the lower ethic of the windshield, on a front side of the windshield;

lateral edge bags in a pair that are deployed to extend along both lateral edges of the windshield so as to cover front pillars in a pair that are provided along the both lateral edges of the windshield, on the front side of the windshield; and an upper edge bag that is deployed to extend along an upper edge of the windshield so as to cover a front edge of a roof panel, on the front side of the windshield, the front edge being provided along the upper edge of the windshield, wherein both ends of the lower edge bag are coupled to lower ends of the lateral edge bags in the pair, and the upper edge bag is coupled to upper ends of the lateral edge bags in the pair, wherein the external airbag is housed in a folded state in a vicinity of the lower edge of the windshield, wherein the external airbag in the folded state is configured in a manner that:

the lateral edge bags are deployed on at least apart of the front pillars;

the lower edge bag is deployed on at least a part of the cowl panel after the lateral edge bags are deployed on at least the part of the front pillars; and the upper edge bag is deployed on at least a part of the front edge of the roof panel after the lower edge bag is deployed on at least a part of the cowl panel, and wherein the folded part comprises a plurality of folds with the lateral edge bags being on an upper side of the folds, the upper edge bag being a fold beneath the lateral edge bags, and the lower edge bag being a fold beneath both of the lateral edge bags and the upper edge bag.

* * * * *